United States Patent [19]

Kulischenko et al.

[11] 4,424,045
[45] Jan. 3, 1984

[54] RIGID HIGH SPEED FLEXIBLE SHAFT CASING ASSEMBLY FOR TIGHT RADII INSTALLATIONS

[75] Inventors: Walter Kulischenko, East Brunswick, N.J.; Martin J. Capdevielle, Staten Island, N.Y.

[73] Assignee: Pennwalt Corporation, Philadelphia, Pa.

[21] Appl. No.: 381,252

[22] Filed: May 24, 1982

[51] Int. Cl.³ .................. F16C 3/035; F16C 35/00
[52] U.S. Cl. .................................. 464/52; 464/170
[58] Field of Search .............. 464/51, 52, 178, 173, 464/183, 182, 170; 74/501 R

[56] References Cited

U.S. PATENT DOCUMENTS

| | | | |
|---|---|---|---|
| 1,481,078 | 5/1924 | Albertson | 464/52 |
| 1,530,381 | 9/1925 | Leedom | 464/52 |
| 1,636,038 | 7/1927 | Bolozky et al. | 464/52 X |
| 1,942,745 | 1/1934 | Coats | 464/178 X |
| 2,446,964 | 8/1948 | Stone | 464/51 X |
| 2,570,335 | 10/1951 | Fitch | 464/178 X |
| 3,945,268 | 3/1976 | Ion et al. | 464/178 X |

FOREIGN PATENT DOCUMENTS

| | | | |
|---|---|---|---|
| 1921140 | 11/1970 | Fed. Rep. of Germany | 464/178 |
| 984340 | 2/1965 | United Kingdom | 464/182 |

*Primary Examiner*—Stuart S. Levy
*Assistant Examiner*—Dao Van Huynh

[57] ABSTRACT

A flexible shaft casing assembly for use in permanent installations wherein the flexible shaft may rotate at high speeds along a tight radius bend or bends in power driven application. The assembly includes a plurality of rigid, curved, tubular casing members which are capable of defining the bends. The casing members are provided with a flared portion at one end which secures a bearing member therein. The casing members are frictionally rotatable 360° within each other by means of the flared portion of one engaging the non-flared portion of an adjacent casing member. Suitable high-temperature epoxy resin renders the bearing members secure in the flared portions of the casing members to provide a permanent installation.

9 Claims, 3 Drawing Figures

RIGID HIGH SPEED FLEXIBLE SHAFT CASING ASSEMBLY FOR TIGHT RADII INSTALLATIONS

STATEMENT OF THE INVENTION

This invention relates to a flexible shaft casing assembly which may be routed along continuously changing bends of tight radii for high speed, power driven applications in permanent installations.

BACKGROUND AND SUMMARY OF THE INVENTION

Flexible shafts comprise basic elements of power transmission and are designed to transmit power or control from a driving element to an element to be driven. Transmission may be over, under, or around obstacles or objects where transmission by solid shafts would be impractical or impossible.

In a typical or conventional rotatable flexible shaft, a wire mandrel has a plurality of layers of closely coiled wire wound thereover, each of the layers being successively wound over another in alternately opposing directions, i.e., right or left-hand lay. This shaft is usually covered by a flexible casing, metallic or covered, and a clearance between the shaft and casing is provided in order that the shaft may rotate freely within the casing.

Rotatable flexible shafts are of two basic types—power driven and remotely controlled. Power driven flexible shafts are designed primarily for motor-driven or high speed operation in one direction. Remote control flexible shafts, on the other hand, are designed primarily for hand-operated control, usually 100 rpm or less, or intermittent high speed use, in either direction of rotation.

The present flexible shaft device or assembly is intended for use in power driven applications where the flexible shaft may be required to rotate at high speeds along a single tight radius bend or along continuously changing bends of tight radii, such, for example, as may be encountered in automobile fan drives, tachometer drives for various farm equipments, certain marine propeller drives, scavenger pump drives for aircraft engines, robotic operations, and the like. The tight radii bends may be disposed in a single plane or routed along multiple planes.

In high speed applications, the flexible shaft becomes hot due to heat generated by constant friction of the shaft wires. When the flexible shaft is routed along a tight radius, friction of the shaft against its companion casing generates additional heat to further unduly shorten the life of the shaft.

The present invention eliminates friction between the shaft and casing even when the shaft is rotating at high speeds in a tight radius. The shaft rotates within bearing members spaced along the tight radius bend or series of tight radius bends. The tightly curved flexible shaft is encased by a casing comprising separate, appropriately curved, rigid tubular casing members. The casing members are provided with a flared portion at one end which receives a bearing member therewithin. The flared portion of one casing member receives the non-flared portion of an adjacent casing member enabling engaging casing members to rotate 360° with respect to each other to thereby permit the flexible shaft assembly to be routed along continuously changing bends of tight radii in several different planes. The bearing members may be secured within the flared portions of the casing members by a suitable epoxy resin or cement to render the final installation permanent.

DETAILED DESCRIPTION OF THE INVENTION

Figure 1:
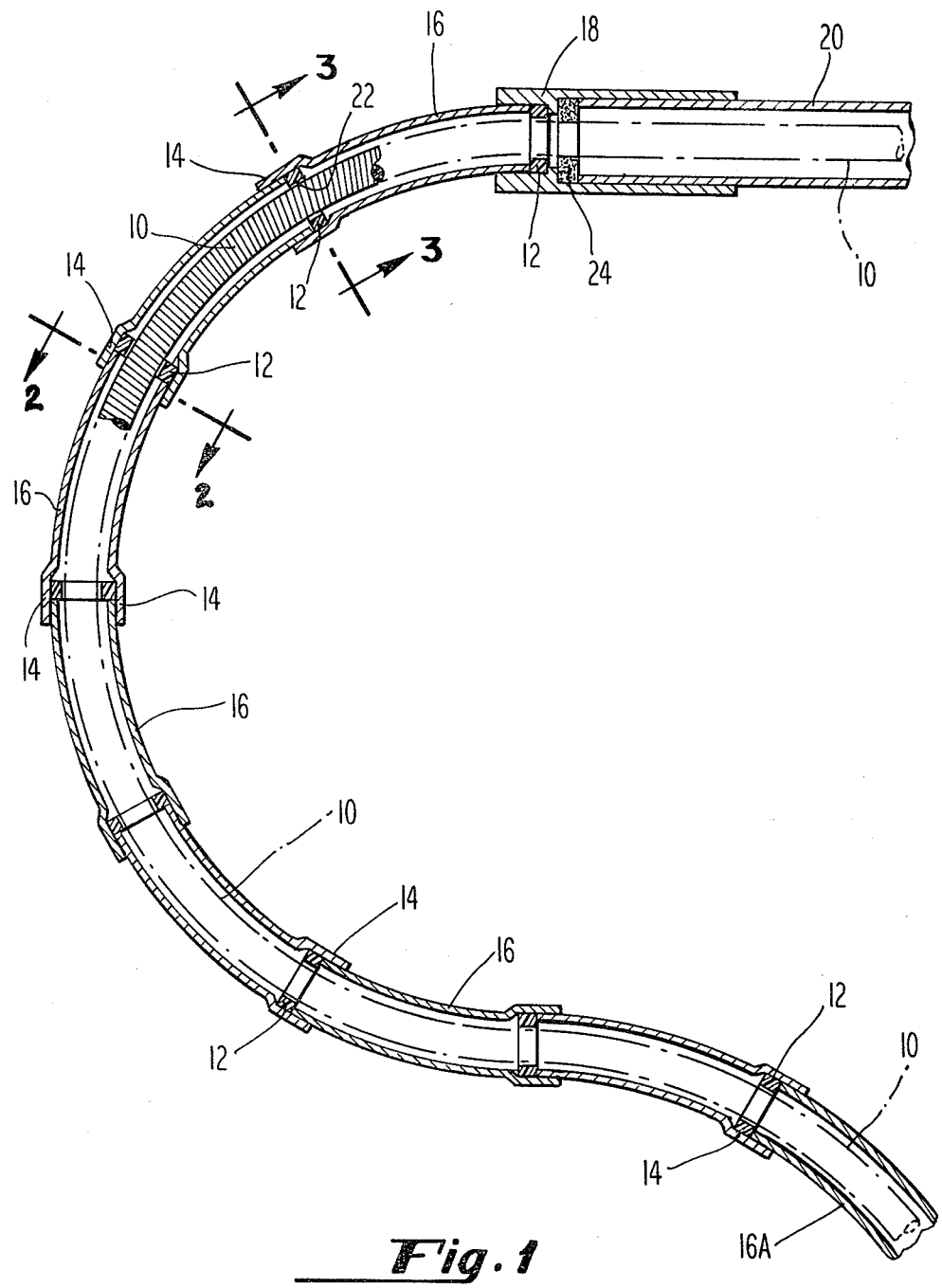
FIG. 1 is an axial view, partially in section and partially diagrammatic, of an embodiment of the flexible shaft assembly of the present invention.
Figure 2:
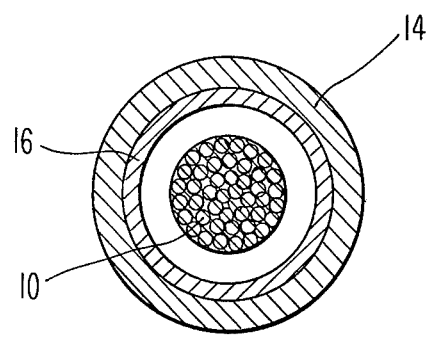
FIGS. 2 and 3 are sectional views of the assembly of FIG. 1 taken along lines 2—2 and 3—3 thereof respectively.
Figure 3:
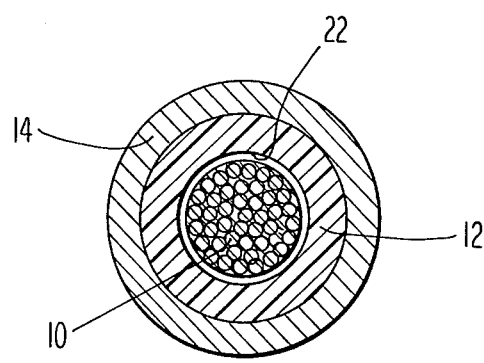

Referring to the drawings, a conventional rotatable flexible shaft 10 is shown employed in a multiple-bend, tight radius, high speed installation. Flexible shaft 10 rotates within spaced narrow bearing members 12, one each being secured within flared portions 14 provided at one end of rigid, tubular casing members 16. Bearings or bearing members 12 are suitably made of a polyimide resin having low wear and low friction properties at high rotational speeds of the flexible shaft. Bearings 12 are capable of withstanding continuous operation at 500° F. with excursions up to 900° F., and may, for example, be Vespel, a product of DuPont.

The non-flared ends of rigid tubular casing members 16, suitably aluminum or copper, for example, are frictionally engageable within flared portions 14 of adjacent casing members 16 and end fitting 18 (as illustrated in FIG. 1) and may be rotated 360° therein to enable the flexible shaft to be routed in curved multi-planar bends. Bearing members 12 may be permanently secured within flared portions 14 of casing members 16 and end fitting or fittings 18 by any suitable high-temperature epoxy resin, for example, to effect a permanent installation.

End fitting 18 may include a bearing member 12 as illustrated. Flexible shaft 10 continues through end fitting 18 and is provided with a conventional casing 20 permanently affixed to end fitting 18, typically by swaging.

The other end of flexible shaft 10 may similarly be fitted with a suitable end fitting (not shown) whether or not casing member 16A is flared, or the shaft may terminate in a conventional integral formed square for reception into a member to be driven or for driving the flexible shaft.

It should be appreciated that the invention is not intended to be limited to the provision of end fitting members, but may include one or two conventional splines, tangs, or even hollow bores which receive corresponding male members. Similarly, the shaft may include threaded or conventional coupling members and the like, but most frequently will include end fitting arrangements similar to the one illustrated.

Openings 22 in bearing members 12 will initially preferably be about 0.010" to 0.025" in diameter larger than the diameter of flexible shaft 10. Over extended periods of operation however, the flexible shaft 10 rotating at high speeds will produce a natural wear pattern on the bearing members which further prolongs the useful life of the present flexible shaft assembly.

Felt seals 24 may optionally be disposed in the end fitting members to function as an internal dam for lubricant provided for the flexible shaft along its tight radius bends.

In installing the present assembly into a high speed installation requiring a permanent tight radius bend or bends, flexible shaft 10 is inserted into tubular casings 16 of appropriate curvature and length with bearings 12 permanently securely disposed within flared portions 14. After the flexible shaft 10 has been routed by virtue of each of the various casing members 16 and end fittings 18 being rotatable 360° in either direction with respect to an adjoining member, the installation may be considered permanent. Optionally, a suitable high temperature epoxy cement or resin may be applied to the casings at their areas of engagement. Flexible shaft 10 may then be encased by conventional casing 20, and end fittings 18 swaged thereover.

We claim:

1. Rigid power driven flexible shaft casing assembly for use in permanent installations requiring tight radius bends, said assembly comprising a rotatable flexible shaft, casing means encasing said flexible shaft along length of said bends, said casing means comprising a plurality of interconnected rigid curved tubular members each having a flared portion and unflared portion at opposite ends thereof, said unflared portions being frictionally received within flared portions of an adjacent tubular member and rotatable 360° therewithin to enable said tight radius bends to be routed along different planes, said flared portions and unflared portions being devoid of taper, a bearing member securely disposed within each of said flared portions for providing bearing surfaces for said rotatable flexible shaft, and coupling means provided adjacent ends of said bends for coupling said rigid flexible shaft casing assembly to driving and driven members.

2. The assembly of claim 1 wherein each of said bearing members comprises an annulus mounted centrally inwardly said flared portions.

3. The assembly of claim 2 wherein each of said bearing surfaces provide a central opening having a diameter slightly larger than diameter of said flexible shaft rotating therewithin.

4. The assembly of claim 2 wherein said bearing members comprise a polyimide resin.

5. The assembly of claim 1 wherein said coupling means comprises at least one end fitting mounted about one of said tubular members adjacent an end of said tight radius bends, said end fitting coupling a conventional flexible shaft with companion casing to said flexible shaft casing assembly.

6. The assembly of claim 5 wherein said tubular members engaging said end fitting is frictionally rotatable 360° therewithin.

7. The assembly of claim 5 wherein said coupling means comprises an end fitting mounted at each end of said tight radius bends, each of said end fittings mounted about one of said tubular members adjacent each end of said tight radius bends, each of said end fittings coupling a conventional flexible shaft with companion casing to said flexible shaft casing assembly.

8. The assembly of claim 7 wherein each of said end fittings is provided with a felt seal therein for internally damming lubricant provided within said casing assembly.

9. The assembly of claim 1 wherein said coupling means comprises an end fitting member mounted adjacent each end of said tight radius bends for coupling said flexible shaft casing assembly to driving and driven members respectively, one of said end fitting members receiving an unflared tubular member frictionally rotatable therein.

* * * * *